United States Patent
Mellquist et al.

(10) Patent No.: US 6,621,823 B1
(45) Date of Patent: Sep. 16, 2003

(54) NETWORK APPLIANCE COMBINING ASYCHRONOUS NOTIFICATION WITH INTERACTIVE NETWORK TRANSFER PROTOCOL SERVER

(75) Inventors: Peter E. Mellquist, Auburn, CA (US); Craig A. VanZante, Roseville, CA (US); Jim A. Baumgartner, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/217,684

(22) Filed: Dec. 21, 1998

(51) Int. Cl.[7] .......................... H04L 12/28; H04L 12/56
(52) U.S. Cl. .................. 370/401; 370/492; 370/501
(58) Field of Search ................. 370/400, 406, 370/419, 420, 423, 424, 492, 493, 501, 502; 709/203, 220, 223, 224

(56) References Cited

U.S. PATENT DOCUMENTS 5,825,775 A * 10/1998 Chin et al. .................. 370/401
6,167,448 A * 12/2000 Hemphill et al. ........... 709/224

* cited by examiner

*Primary Examiner*—Douglas Olms
*Assistant Examiner*—Phirin Sam

(57) ABSTRACT

A network hub responds to network problems by generating traps in conformance with the Simple Network Management Protocol (SNMP). In generating a trap, the hub includes a Uniform Resource Locator (URL) as a text string incorporated in the trap. The network hub incorporates a server conforming to the HyperText Transfer Protocol (HTTP) used by the World Wide Web. The server has its own home page and the URL incorporated in the trap points to a subpage of that home page. When a network management station receives the trap, the URL is displayed as a hypertext link. When the link is "clicked", a web browser is activated and is pointed to the URL so that an HTTP "get" command is transmitted. When the hub receives the "get" command, it responds by generating the requested subpage. The subpage is presented as a World Wide Web page with a full presentation of data relating to the event triggering the trap. In addition, the subpage includes active elements (hypertext links, buttons, and/or menu items) that when activated initiate a course of action to address the detection of the network problem.

5 Claims, 5 Drawing Sheets

NETWORK APPLIANCE COMBINING ASYCHRONOUS NOTIFICATION WITH INTERACTIVE NETWORK TRANSFER PROTOCOL SERVER

BACKGROUND OF THE INVENTION

The present invention relates to computer networks and, more particularly, to a network appliance that monitor parameters (e.g., related to their own and/or a network's performance). A major objective of the present invention is to facilitate fault handling in a computer network.

Computer networks allow computer users to communicate, collaborate, and share resources. While there are peer-to-peer computer networks, most sophisticated networks use network infrastructure appliances, e.g., hubs, switches, and routers, to manage communication between end-node appliances, e.g., computers, printers, modems, instrumentation, etc. A typical network infrastructure appliance includes multiple ports, each of which can be coupled to an end-node appliance or another network appliance. Networked end-node appliances communicate with each other through the network infrastructure appliances.

Just as individuals rely increasingly on computers for getting their work done, corporations rely increasingly on networks for getting their personnel to work cooperatively. When a network fails, group efforts grind to a halt, as do individual efforts relying on network resources. To a lesser degree, productivity is adversely affected when network performance is impaired. Accordingly, maintaining a network working and performing at optimal levels is highly desirable, if not critical. Unfortunately, such maintenance can also be quite difficult.

Many network appliances monitor performance-related parameters and, when the values of these parameters fail to meet certain criteria, transmit a notification to that effect over the network. For example, network infrastructure appliances often include counters for counting certain network related events (e.g., packet collisions); when a count or combination of counts indicates a problem, a "trap" can be transmitted in accordance with a Simple Network Management Protocol (SNMP). For another example, a printer can monitor its components; when a problem is detected, the printer can transmit an "inform" in accordance with a Desktop Management Interface (DMI) protocol.

The various notifications can be received by a network management station, such as a computer devoted at least in part to network management. The network management station can present the notifications to a human administrator, who can determine whether or not corrective action is required and who can undertake corrective action if required.

In many cases, the information included in the notification is not comprehensive. Transmitting all pertinent information regarding triggering events might unduly burden a network; also, the pertinence of the information might wane if the administrator does not address the notification immediately. Accordingly, a concise notification is often a prelude to a more detailed investigation by the administrator.

When the more detailed information is desired, the administrator can request (through the network management station) that the network appliance transmit additional information. If the detailed information is presented in "raw" form, considerable demands are made on the expertise of the administrator in interpreting the data to diagnose the problem and in evaluating alternative courses of action. These demands are compounded in the common case where the network includes many appliance types, each with its own relevant parameters and alternative corrective actions. Since the individual trigger events might occur infrequently, an administrator might have to refer to the appropriate appliance manual each time a triggering-event notification is received.

The burden on the administrator can be relieved considerably by including the expertise into the network management station. The network management station can include a characterization of each appliance type on the network. The characterization can be used in interpreting appliance data and in suggesting alternative courses of action.

While such a solution appears feasible in a network in which all appliances (including the network management station) are from a single vendor, it is less workable where there are appliances from multiple vendors involved. Furthermore, when a new appliance type is added to the network, the network management station would have to be updated (e.g., through a patch or module added to the network management program running on the network management station). This might mean that each new appliance would have to be sold with program updates for each network administration program.

Thus, however they are allocated between the administrator and the network management station, the tasks of notification data interpretation and of determining responses can be unduly burdensome. What is needed is a network administration system, which minimizes the burden on the network administrator while allowing ready expandability of a network.

SUMMARY OF THE INVENTION

The present invention provides a network appliance that incorporates both asynchronous notification of "triggering" events and a server that conforms to an interactive network transfer protocol such as the HyperText Transfer Protocol (HTTP). When the network appliance detects a triggering event calling for notification to the network management station, it issues the notification and specifies therein a "Uniform Resource Locator" (URL) including a "Uniform Resource Identifier" (URI) pointing to a network location on the server.

Complementarily, the present invention provides for a variety of ways for a network management station to handle the notification. For example, it can simply inform a user of the URL by displaying it in text form on a display. In this case, a user can copy the URL to a web browser (or other HTTP-enabled program), and access the location characterizing the triggering event. Preferably, the network management station either incorporates or interfaces with a browser so that a simple point and click operation accesses the network appliance server. In this vein, the network management program can present the URL as a hypertext link, as a button, or as a menu selection. Activating the link, button or menu item can access the URL directly or, alternatively, call a browser that in turn accesses the URL.

When the URL is accessed, the network appliance server can provide the information relating to the event in conformance with the HTTP standard. Preferably, the information is presented on a web page that is a subpage of a home page associated with the server. Also preferably, the subpage can include active display elements (hypertext links, buttons, and/or menu items) that can initiate network management actions appropriate to the triggering event. These actions can involve changing the state of the network appliance (e.g., by resetting counters) for further diagnosis or for ignoring the event. To conserve memory on the appliance, the subpage can be generated after the URL is received (rather than when the notification is transmitted).

Unlike most appliances with web servers, the present invention provides for efficient access to asynchronous (not initiated by the user) events at the server. For the most part, the web interface is operated by user commands; in other words, the web interface mostly provides for synchronous communication from the server and the user. Combining the web. interface with a network or appliance management protocol allows asynchronous network events to initiate interaction with the web server on the network appliance. In general, access to appliances is through the home page. It is often necessary to navigate to various subpages to find information of interest. By providing the URI (the part of the URL indicating the location within a server where certain information can be found), the present invention avoids the tedium of navigating through a web interface.

An interactive-network-transfer protocol is a network protocol in which: 1) a client can transmit a command to a server; 2) the server responds to the command by transmitting (generating first if required) data including active elements to the client; 3) the client displays the data including representations of the active elements; 4) activation of active elements by a client user causes data to be transmitted to the server; and 5) the server, upon receiving data transmitted in response to activation of an active element, performs some action, typically involving the transmission of data to the client so that the client display is modified. HTTP is the most widely familiar interactive-network-transfer protocol. However, the invention can be applied in the context of alternative interactive-network-transfer protocols.

One advantage of the present invention is that it provides a familiar interface for a network administrator to manage a network. For example, the World Wide Web is not only a standard interface for the Internet, but also for intranets. Also, there is a trend to provide network appliances with web interfaces. Thus, minimal training is required for a network administrator to learn the interface.

A second advantage of the invention, which is both subtle and surprising, is that it obviates the need to update the network management software as new types of network appliances are incorporated into the network. All the information regarding a triggering event and the options for handling it are handled by the web server on the network appliance. The network management program on the network management station does not need to have a characterization of each network appliance. The only requirement is that the network management program be able to communicate the URL associated with the triggering event to the user or to the user's browser.

A third advantage is that effort on the user's part in accessing information about the triggering event is minimized. In a typical realization of the invention, one point-and-click operation is required to access the relevant page of the appliance server; one more point-and-click is often sufficient as a response to the triggering event.

A fourth advantage is that network burden is minimized. Since the network appliance provides the notification asychronously, there is no need for a network management station to maintain a continuous connection with or to repeatedly poll appliances employing the present invention. Thus, network traffic directed to network management is minimized when there are no problems requiring notification. These and other features and advantages of the invention are apparent from the description below with reference to the following drawings.

DETAILED DESCRIPTION OF THE PREFERRED EMBODIMENTS

In accordance with the present invention, a network system AP1 includes three repeater hubs H1, H2, and H3, three computer workstations W1, W2, and W3, a monochrome laser printer P1, a color laser printer P2, and a color ink-jet printer P3, and eight cables. Six of the eight cables are coupled to the six node appliances W1, W2, W3, P1, P2, P3; the other two cables CH1 and CH3 couple hubs.

Hub H1 has four ports, P11, P12, P13, and P14. Port P11 is not being used. Port P12 is coupled to printer P1. Port P13 is coupled to hub H2 via cable CH1. Port P14 is coupled to workstation W1. Workstation W1 includes a hard disk HD1 on which a network management program and a web browser are stored.

Hub H2 also has four ports, P21, P22, P23, and P24. Port P21 is coupled to port P13 of Hub H1 via cable CH1. Port P22 is coupled to printer P2. Port P23 is coupled to hub H3 via cable CH3. Port P24 is coupled to workstation W2.

Hub H1 has four ports, P31, P32, P33, and P34. Port P31 is coupled to port P23 via cable CH3. Port P32 is coupled to printer P3. Port P33 is not being used. Port P34 is coupled to workstation W3.

Figure 1:
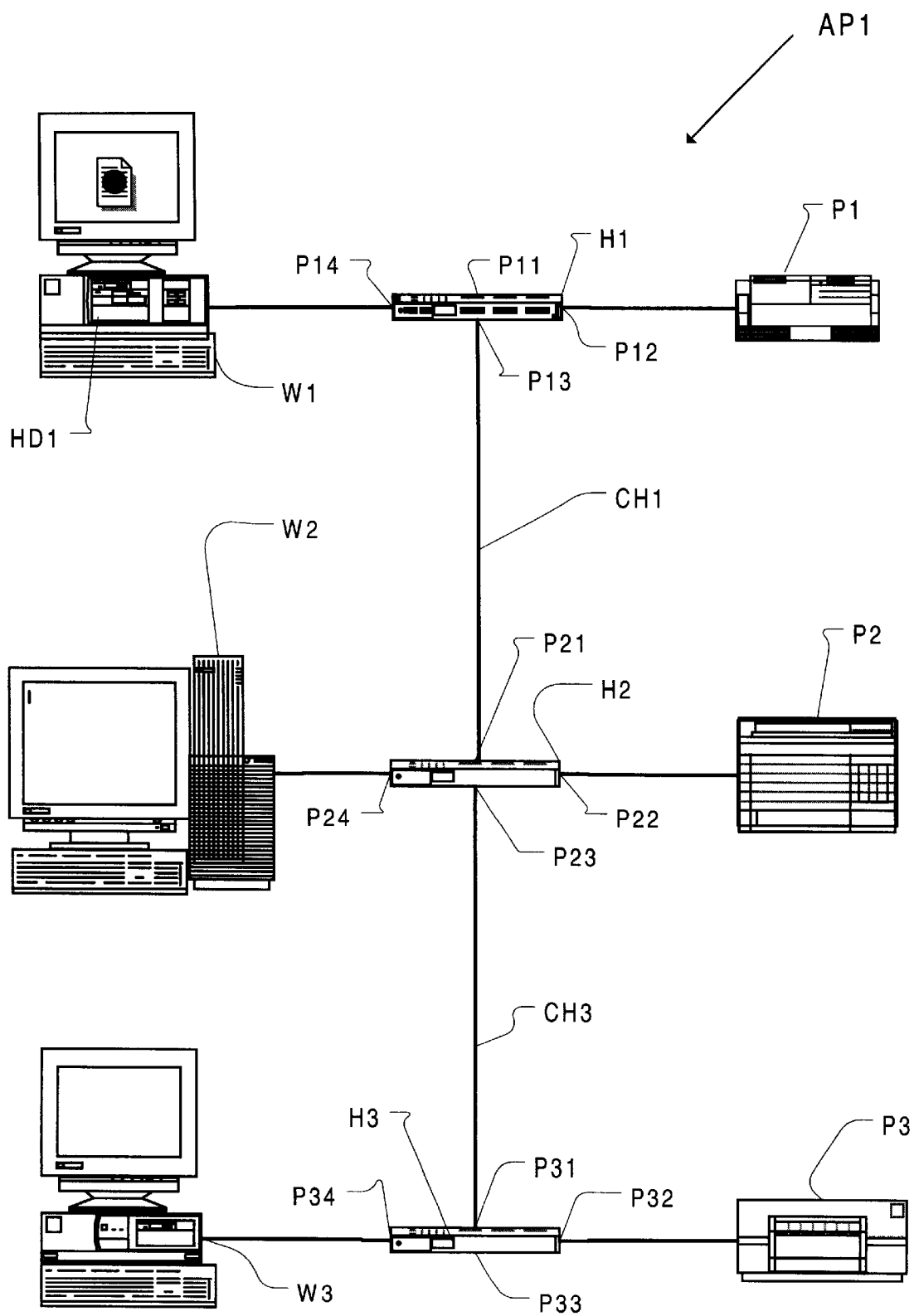
FIG. 1 is a schematic diagram of a network incorporating the present invention.
Figure 2:
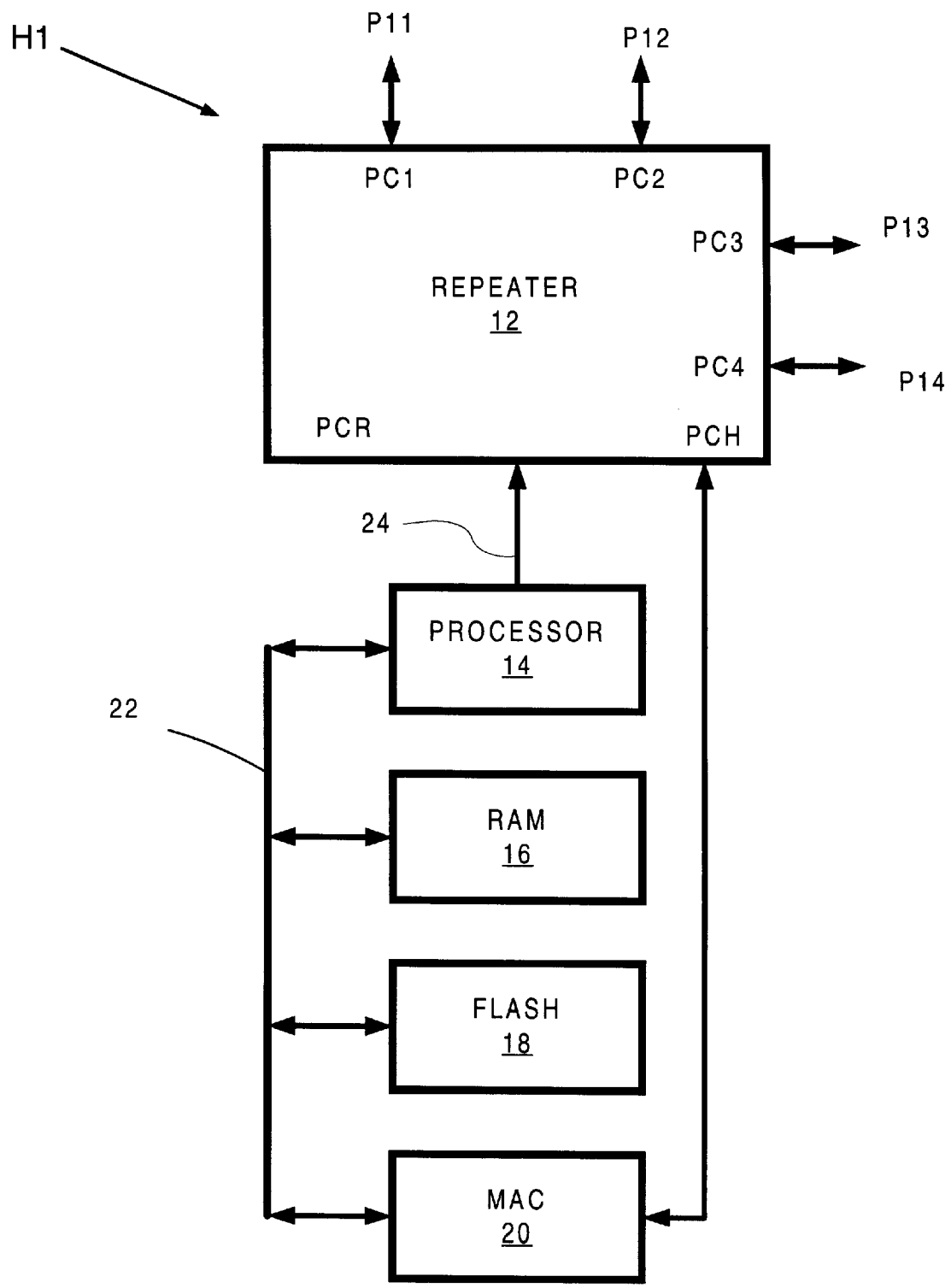
FIG. 2 is a schematic diagram of a hub of the network of FIG. 1 and incorporating the present invention.

Hub H1 comprises a repeater 12, a processor 14, volatile random-access memory (RAM) 16, nonvolatile flash memory 18, and a media access controller 20, as shown in FIG. 2. The latter four elements are coupled via a communications bus 22. Repeater 12 includes groups of counters PC1, PC2, PC3, and PC4, which are dedicated to respective ports, and a repeater-wide group of counters PCR. Processor 14 executes programs stored in flash memory 18, controlling repeater 12 directly over a control bus 24. These appliance-resident programs provide for network monitoring processes by reading the counters, event handling, web serving, and storing event data in volatile RAM memory 16 in the form of a Management Information Base (MIB). Media access controller 20 is coupled to repeater 12 through an internal port PCH, permitting controller 20 to serve as the source and destination of network communications.

Figure 3:
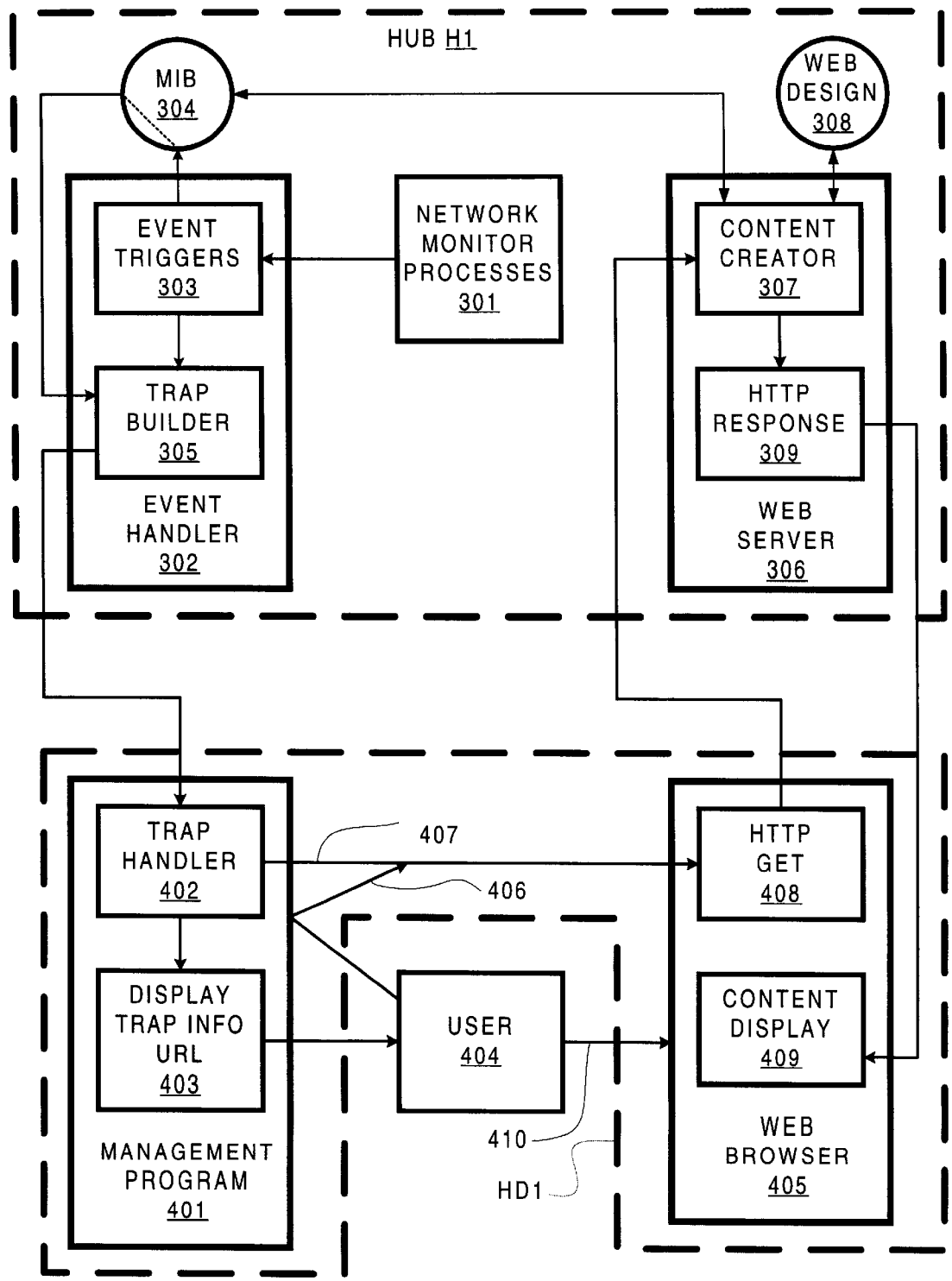
FIG. 3 is a data flow diagram of a method of the present invention practiced in the context of the network of FIG. 1.

The functional components of hub H1 are represented in FIG. 3. Multiple network monitoring processes 301 are performed in parallel by polling various hub counters. When a count or a calculation based on counts goes beyond a trigger threshold, an event handler 302 activates an event trigger at 303. The event trigger causes the data pertinent to the triggering event to be stored in Management Information Base at 304.

The event trigger identifies an enterprise based on the triggering event to a trap builder 305 of event handler 302.

Management Information Base 304 provides the values (binds) for the parameters (variables) associated with the enterprise. Included among the parameters are those associated with the triggering event and a Uniform Resource Locator (URL) in the form of a text string.

The URL includes two portions: a first that identifies the web server network address; and a second, the Uniform Resource Indicator (URI), that indicates web content on the server. To save on memory, no web page is actually created at the web location pointed to by the URI when the trap is generated. Instead, the web page is created after it is requested in response to an HTTP "get" request.

Trap builder 305 transmits the trap over the network to network management station W1, whence it is passed to network management program 401, and more specifically to its trap handler 402. Trap handler 402 notifies the user 404 by placing a message on the computer display at 403 that a network event has taken place. In addition, trap handler 402 provides the trap data to other portions of management program 401 for logging and other standard network management actions to be taken.

User 404, once notified, can use a pointing device such as a mouse to click on a button displayed at 403 that calls web browser 405. This action is shown at jointed arrow 406. As web browser 405 is accessed, trap handler 402 passes at 407 the URL generated by trap builder 305 to web browser 405 so that it is incorporated into an HTTP "get" action at 408.

The "get" action is transmitted to a web server 306 of hub H1. The web server parses the Uniform Resource Indicator and provides it to an incorporated content creator 307. Content creator 307 accesses Management Information Base 304 to determine the nature of the triggering event. Content creator 307 also accesses a web design module 308 to determine how information about the event and other appliance-specific information is to be presented. Appliance-specific information is useful since the same event, e.g., a collision count, can have different implications for different appliances (e.g., hubs versus switches). The web design information and the event information are coordinated by content creator 307, which thus generates a web page (having the URL generated by trap builder 305 as its network address). This web page is transmitted as an HTTP response at 309 to web browser 405, whence it is displayed at 409.

The web page identifies the event that triggered the trap, organizes the data related to the event, and lists alternative courses of action that can be taken. Actions that can be performed without additional intervention are presented as buttons in the browser. When activated at arrow 410, a button causes an HTTP message to be communicated to web server 306, which then implements the action called for (e.g., reading MIB 304, or by resetting a network monitor process).

Figure 4:
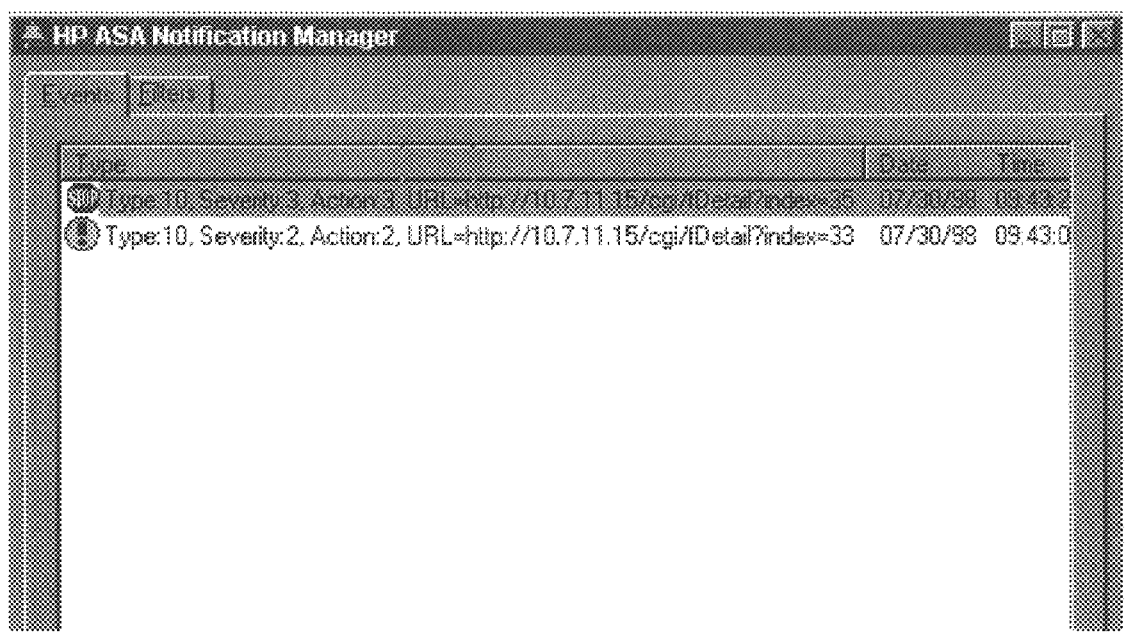
FIG. 4 is an image of a portion of a window on a network management station generated in response to notifications transmitted in accordance with the method of FIG. 3.
Figure 5:
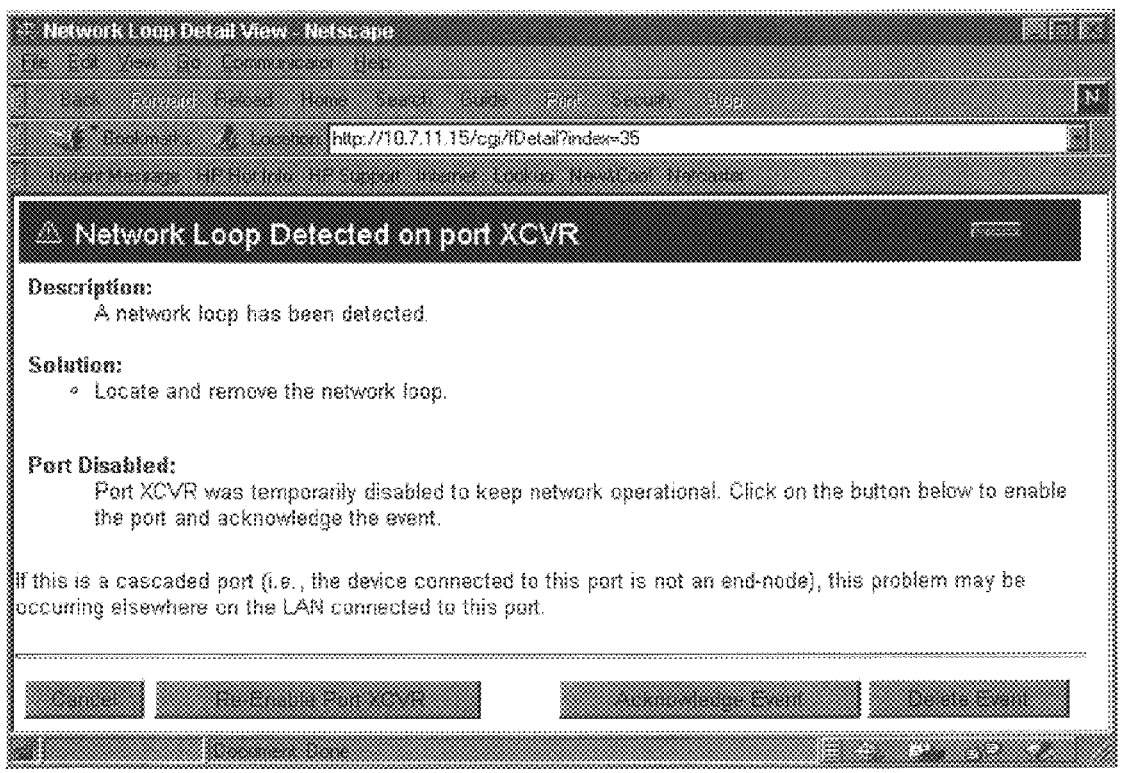
FIG. 5 is an image of a browser window on a network management station generated in response to a "get" request issued in accordance with the method of FIG. 3.

FIG. 4 shows a portion of a window in network management program showing two sequential notifications, first a warning, then a stop, of a network loop on an appliance with a URL http:\\10.7.11.15. Clicking on either line activates a drop down menu. Selecting "browse URL" sends a "get" request to the appliance server. Performing this sequence for the top line causes the web page shown in FIG. 5 to be generated, transmitted, and displayed. In this case, the web page describes the problem detected, offers a solution, and indicates what ports, if any, have been disabled automatically. In addition, four active elements, in this case buttons with text, offer one-click access to alternative courses of action.

A major advantage of the illustrated hub operation is best understood from the perspective of the user. Once notified asynchronously of a problematic event, the user needs only to "point and click", e.g., with a mouse, once to obtain a complete description of the problem. Furthermore, the description is provided using a standard ergonomic graphical interface. One more point and click by the user can instigate a corrective action. Thus, many network problems can be addressed with a pair of point and click operations.

Another major advantage of the invention comes into operation when the network is upgraded by adding a new type of network appliance incorporating the present invention. The network appliance can include provisions for monitoring new parameters and new options for responding to network problems can be provided. The present invention allows such a network appliance to be added to the network without replacing or updating the network management station.

In the preferred embodiment, the network appliance is a hub; the invention applies to other network infrastructure appliances such as switches and routers, as well as to end-node appliances such as computers, printers, and modems. While, in the preferred embodiment, the network appliance conforms to SNMP, other protocols, .such as DMI and proprietary protocols, can be employed.

In the preferred embodiment, the appliance transmits the URL in its entirety as a text string. In this case, it is the content, not the form of the URL that is important. For example, the URI can be transmitted and the server portion of the URL can be constructed from the notification in accordance with the protocol employed.

The network management station can present the URL as a hypertext link. Alternatively, the URL can be presented as text that can be copied and pasted into a browser. Instead of a hypertext link, the URL can be presented implicitly as a button or as a menu option. When an active element corresponding to the URL is activated, the appliance can be accessed directly by the network management program (if it incorporates the HTTP protocol) or indirectly (in which case, the network management program calls the browser and preferably passes the URL to it).

While HTTP is the dominant interactive-network-transfer protocol, the present invention provides for alternatives that provide for active elements. The parameters can be of several types: those that indicate problems with the network; those that indicate problems with the appliances incorporating the invention; and problems associated with appliances monitored by an appliance in accordance with the invention. For example, a redundant uninterruptable power supply might be coupled to a network appliance through a non-network connection (e.g., a serial port) to indicate when one of the redundant component fails; in this case, the network appliance can "translate" the power supply notification to one receivable by the network management station. Accordingly, the present invention provides for maintenance of both network and non-network appliances from a common network management program.

In the preferred embodiment, the server is contained entirely within the appliance enclosure. However, the invention provides for the use of a server that is partly or completely external to the appliance enclosure. For example, the appliance can send a URL pointing to an external server. This server can either access the appliance or maintain a copy of the appliance's Management Information Base. Such a server can serve several appliances in accordance with this variation of the invention. In another alternative embodiment, the appliance provides the URL associated with its internal server, but forwards the "get" command to a remote server. Both these alternatives minimize the storage requirements for individual appliances.

The invention applies to appliances that monitor a single parameter as well as to appliances that monitor multiple parameters. In the latter case, the invention applies to appliances that look at a combination of parameters to determine when some notifications are to be made. In the latter case, plural scalar or vector parameters can be treated as a single vector parameter, the values for which are also vectors. These and other variations upon and modifications to the present invention are provided for by the present invention, the scope of which is limited only by the following claims.

What is claimed is:

1. A network appliance comprising:

a set of ports for coupling to network devices other than said appliance;

counters for detecting and enumerating instances of respective event types relating to the performance of said network, at least some of said counters being coupled to respective ones of said ports for examining data received thereat;

execution means for executing a program, said execution means being coupled to said counters;

computer readable media coupled to said execution means;

a monitoring program embodied in said computer readable media, said monitoring program when executed retrieving counts from said counters, calculating values of network-performance related parameters as a function of said counts, comparing said values with thresholds to determine whether or not a notification should be generated, and in the event a comparison indicates that a notification should be generated, generating and transmitting on said network a notification that specifies a network location associated with said network monitoring program; and a server application for, in the event that said network location is addressed, specifying a course of action to be taken to mitigate a problem associated with said notification.

2. A network appliance as recited in claim 1 wherein said network address has the format of an Uniform Resource Locator.

3. A network appliance as recited in claim 2 wherein said network address has the format of a World Wide Web address.

4. A network appliance as recited in claim 3 wherein said server application has a home page, said network address pointing a subpage of said home page.

5. A network appliance as recited in claim 4 wherein said server application generates said subpage upon reception of said network address from another network device.

\* \* \* \* \*